United States Patent
Shu et al.

(10) Patent No.: US 8,527,570 B1
(45) Date of Patent: Sep. 3, 2013

(54) LOW COST AND HIGH SPEED ARCHITECTURE OF MONTGOMERY MULTIPLIER

(75) Inventors: Chang Shu, San Jose, CA (US); Heng Tang, San Jose, CA (US); Sean Lee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 504 days.

(21) Appl. No.: 12/855,340

(22) Filed: Aug. 12, 2010

Related U.S. Application Data (60) Provisional application No. 61/233,432, filed on Aug. 12, 2009.

(51) Int. Cl.
*G06F 7/38* (2006.01)
(52) U.S. Cl.
USPC .......................................................... 708/491
(58) Field of Classification Search
USPC .......................................................... 708/491
See application file for complete search history.

(56) References Cited

U.S. PATENT DOCUMENTS

| | | | | |
|---|---|---|---|---|
| 6,151,393 | A * | 11/2000 | Jeong ............................. | 708/491 |
| 6,763,365 | B2 * | 7/2004 | Chen et al. ..................... | 708/491 |
| 2003/0206629 | A1 | 11/2003 | Eberle et al. | |

OTHER PUBLICATIONS

V.S. Miller, "Use of Elliptic Curves in Cryptography", in Proc. Adv. Cryptolog. (Crypto '85), 1986, pp. 417-426.
G. Agnew, R. Mullin, I. Onyszchuk and S. Vanstone, "An Implementation of Elliptic Cruve Cryptosystems Over F2155," IEEE J. Selected Areas Communications, vol. 11, pp. 804-813, Jun. 1993.
Sutikno, A. Surya, and R. Effendi, "An Implementation of ElGamal Elliptic Curve Cryptosystems," Proc. 1998 IEEE Asian Pacific Conf. Circuits and Systems (APCCAS '98), pp. 483-486, Nov. 1998.
G. Orlando and C. Paar, "A High-Performance Reconfigurable Elliptic Curve Processor for GF (2m)," Proc. Cryptographic Hardware and Embedded Systems (CHES 2000), pp. 41-56, Aug. 2000.
T. Izu and T. Takagi, "Fast Elliptic Curve Multiplications Resistant Against Side Channel Attacks," IEICE Transactions on Fundamentals, vol. E88-A, No. 1, Jan. 2005.
P.L. Montgomery, "Modular Multiplication Without Trial Division," Mathematics of Computation, 44 (170):519-521, Apr. 1995.

(Continued)

*Primary Examiner* — Tan V. Mai (57) ABSTRACT

A system to perform Montgomery multiplication includes a first multiplier array configured to multiply w bits of an operand X by W bits of an operand Y, where w and W are integers and w is less than W. A second multiplier array is configured to multiply w bits of an operand Q by W bits of a modulo M. An adder array is configured to add outputs of the first and second multiplier arrays to generate a sum. A partial sum array is configured to store a left portion of the sum. A memory is configured to store a right portion of the sum. Q computation logic includes a lookup table and a half-multiplier that compute W bits of the operand Q sequentially in

$$2 \cdot \frac{W}{w}$$

cycles or $$\frac{W}{w}$$

cycles. The W bits of the operand Q are stored in the fourth buffer for use by subsequent W×W operations.

22 Claims, 9 Drawing Sheets

(56) References Cited

OTHER PUBLICATIONS

A. Tenca and C. K. Koc, "A Scalable Architecture for Montgomery Multiplication," CHES 99, Lecture Notes in Computer Sciences, 1717, pp. 94-108, 1999.

A. Tenca, G. Todorov, and C. K. Koc, "High-radix Design of a Scalable Modular Multiplier," CHES 2001, Lecture Notes in Computer Sciences, 2162, pp. 185-201, 2001.

A. Tenca and C. K. Koc, "A Scalable Architecture for Modular Multiplication Based on Montgomery's Algorithm," IEEE Trans. Computers, 52(9), pp. 1215-1221, 2003.

M. Huang, K. Gaj, S. Kwon, and T. El-Ghazawi, "An Optimized Hardware Architecture for the Montgomery Multiplication Algorithm," Proc. 11th International Workshop on Practice and Theory in Public Key Cryptography, PKC 2008, Barcelona, Spain, pp. 214-228, Mar. 2008.

\* cited by examiner

Require: odd $M, n = \lfloor \log_2 M \rfloor + 1, X = \sum_{i=0}^{n-1} x_i \cdot 2^i$, with $0 \leq X, Y \leq M$
Ensure: $Z = X \cdot Y \cdot 2^{-n} \mod M, 0 \leq Z < M$
1: $S[0] = 0$
2: for $i = 0$ to $n - 1$ step 1 do
3:     $q_i = S[i] + x_i \cdot Y (\mod 2)$
4:     $S[i+1] = (S[i] + x_i \cdot Y + q_i \cdot M)/2$
5: end for
6: if $S[n] > M$ then
7:     $S[n] = S[n] - M$
8: end if
9: return $Z = S[n]$

Require: odd $M, n = \lfloor \log_2 M \rfloor + 1, f = \lceil \frac{n}{W} \rceil, X = \sum_{i=0}^{f-1} X_i \cdot 2^{i \cdot W}, Y = \sum_{j=0}^{f-1} Y_j \cdot 2^{j \cdot W}$, with $0 \le X, Y \le M$
Ensure: $Z = X \cdot Y \cdot 2^{-f \cdot W} \mod M, 0 \le Z < M$
1:  $msb \leftarrow 0, (Z_{f-1}, Z_{f_2}, \cdots Z_2, Z_1, Z_0) \leftarrow 0$
2:  for $i = 0$ to $f - 1$ step 1 do
3:      $(x_{e-1}, x_{e-2}, \cdots, x_2, x_1, x_0) \leftarrow X_i, S_L \leftarrow 0, CA \leftarrow 0$
4:      for $j = 0$ to $f - 1$ step 1 do
5:          $(y_{e-1}, y_{e-2}, \cdots, y_2, y_1, y_0) \leftarrow Y_j, (m_{e-1}, m_{e-2}, \cdots, m_2, m_1, m_0) \leftarrow M_j$
6:          if $j = f - 1$ then
7:              $(z_{e-1}, z_{e-2}, \cdots, z_2, z_1, z_0) \leftarrow (msb, Z_j)$
8:          else
9:              $(z_{e-1}, z_{e-2}, \cdots, z_2, z_1, z_0) \leftarrow Z_j$
10:         end if
11:         for $g = 0$ to $e - 1$ step 1 do
12:             for $k = 0$ to $e - 1$ step 1 do
13:                 if $k = 0$ then
14:                     if $g = 0$ then
15:                         $sum_k \leftarrow s_{L,k} + ca_k + (x_g \cdot y_k)_R + z_k$
16:                     else
17:                         $sum_k \leftarrow s_{L,k} + ca_k + (x_g \cdot y_k)_R$
18:                     end if
19:                     if $j = 0$ then
20:                         $q \leftarrow (sum_0 \mod 2^w) \cdot (-m_0^{-1} \mod 2^w) \mod 2^w$
21:                         $Q_i = (q_{e-1}, q_{e-2}, \cdots, q_2, q_1, q_0) \leftarrow (q, q_{e-1}, \cdots, q_3, q_2, q_1)$
22:                     else
23:                         $q \leftarrow q_0$
24:                         $Q_i = (q_{e-1}, q_{e-2}, \cdots, q_2, q_1, q_0) \leftarrow (q_0, q_{e-1}, \cdots, q_3, q_2, q_1)$
25:                     end if
26:                     $sum_k \leftarrow sum_k + (q \cdot m_k)_R$
27:                     $(s_{R,e-1}, s_{R,e-2}, \cdots, s_{R,2}, s_{R,1}, s_{R,0}) \leftarrow (sum_k \mod 2^w, s_{R,e-1}, \cdots, s_{R,3}, s_{R,2}, s_{R,1})$
28:                 else
29:                     if $g = 0$ then
30:                         $sum_k \leftarrow s_{L,k} + ca_k + (x_g \cdot y_{k-1})_L + (x_g \cdot y_k)_R + z_k$
31:                     else
32:                         $sum_k \leftarrow s_{L,k} + ca_k + (x_g \cdot y_{k-1})_L + (x_g \cdot y_k)_R$
33:                     end if
34:                     $sum_k \leftarrow sum_k + (q \cdot m_k)_R + (q \cdot m_{k-1})_L$
35:                     $s_{L,k-1} \leftarrow sum_k \mod 2^w$
36:                     if $j = e - 1$ then
37:                         $s_{L,k} \leftarrow (x_g \cdot y_k)_L + (q \cdot m_k)_L$
38:                     end if
39:                 end if
40:                 $ca_k \leftarrow sum_k \gg w$
41:             end for
42:         end for
43:         if $j > 0$ then
44:             $Z_{j-1} \leftarrow S_R$
45:         end if
46:         if $j = f - 1$ then
47:             $(msb, Z_{f-1}) \leftarrow CA + S_L$
48:         end if
49:     end for
50: end for
51: if $(msb, Z) \ge M$ then
52:     $Z \leftarrow (msb, Z) - M$
53: end if
54: return $Z$

| Address | $m_0$ | $-m_0^{-1}$ | Address | $m_0$ | $-m_0^{-1}$ | Address | $m_0$ | $-m_0^{-1}$ | Address | $m_0$ | $-m_0^{-1}$ |
|---|---|---|---|---|---|---|---|---|---|---|---|
| 0 | 1 | 255 | 1 | 3 | 85 | 2 | 5 | 51 | 3 | 7 | 73 |
| 4 | 9 | 199 | 5 | 11 | 93 | 6 | 13 | 59 | 7 | 15 | 17 |
| 8 | 17 | 15 | 9 | 19 | 229 | 10 | 21 | 195 | 11 | 23 | 89 |
| 12 | 25 | 215 | 13 | 27 | 237 | 14 | 29 | 203 | 15 | 31 | 33 |
| 16 | 33 | 31 | 17 | 35 | 117 | 18 | 37 | 83 | 19 | 39 | 105 |
| 20 | 41 | 231 | 21 | 43 | 125 | 22 | 45 | 91 | 23 | 47 | 49 |
| 24 | 49 | 47 | 25 | 51 | 5 | 26 | 53 | 227 | 27 | 55 | 121 |
| 28 | 57 | 247 | 29 | 59 | 13 | 30 | 61 | 235 | 31 | 63 | 65 |
| 32 | 65 | 63 | 33 | 67 | 149 | 34 | 69 | 115 | 35 | 71 | 137 |
| 36 | 73 | 7 | 37 | 75 | 157 | 38 | 77 | 123 | 39 | 79 | 81 |
| 40 | 81 | 79 | 41 | 83 | 37 | 42 | 85 | 3 | 43 | 87 | 153 |
| 44 | 89 | 23 | 45 | 91 | 45 | 46 | 93 | 11 | 47 | 95 | 97 |
| 48 | 97 | 95 | 49 | 99 | 181 | 50 | 101 | 147 | 51 | 103 | 169 |
| 52 | 105 | 39 | 53 | 107 | 189 | 54 | 109 | 155 | 55 | 111 | 113 |
| 56 | 113 | 111 | 57 | 115 | 69 | 58 | 117 | 35 | 59 | 119 | 185 |
| 60 | 121 | 55 | 61 | 123 | 77 | 62 | 125 | 43 | 63 | 127 | 129 |
| 64 | 129 | 127 | 65 | 131 | 213 | 66 | 133 | 179 | 67 | 135 | 201 |
| 68 | 137 | 71 | 69 | 139 | 221 | 70 | 141 | 187 | 71 | 143 | 145 |
| 72 | 145 | 143 | 73 | 147 | 101 | 74 | 149 | 67 | 75 | 151 | 217 |
| 76 | 153 | 87 | 77 | 155 | 109 | 78 | 157 | 75 | 79 | 159 | 161 |
| 80 | 161 | 159 | 81 | 163 | 245 | 82 | 165 | 211 | 83 | 167 | 233 |
| 84 | 169 | 103 | 85 | 171 | 253 | 86 | 173 | 219 | 87 | 175 | 177 |
| 88 | 177 | 175 | 89 | 179 | 133 | 90 | 181 | 99 | 91 | 183 | 249 |
| 92 | 185 | 119 | 93 | 187 | 141 | 94 | 189 | 107 | 95 | 191 | 193 |
| 96 | 193 | 191 | 97 | 195 | 21 | 98 | 197 | 243 | 99 | 199 | 9 |
| 100 | 201 | 135 | 101 | 203 | 29 | 102 | 205 | 251 | 103 | 207 | 209 |
| 104 | 209 | 207 | 105 | 211 | 165 | 106 | 213 | 131 | 107 | 215 | 25 |
| 108 | 217 | 151 | 109 | 219 | 173 | 110 | 221 | 139 | 111 | 223 | 225 |
| 112 | 225 | 223 | 113 | 227 | 53 | 114 | 229 | 19 | 115 | 231 | 41 |
| 116 | 233 | 167 | 117 | 235 | 61 | 118 | 237 | 27 | 119 | 239 | 241 |
| 120 | 241 | 239 | 121 | 243 | 197 | 122 | 245 | 163 | 123 | 247 | 57 |
| 124 | 249 | 183 | 125 | 251 | 205 | 126 | 253 | 171 | 127 | 255 | 1 |

| Algorithm 3 Traditional method computing $r = 2^{2n} \mod M$ |
|---|
| Require: odd $M, n = \lfloor \log_2 M \rfloor + 1$ |
| Ensure: $r = 2^{2n} \mod M, 0 \leq r < M$ |
| 1: $r \leftarrow 2^n$ |
| 2: for $i = 0$ to $n$ step 1 do |
| 3: $\quad r \leftarrow r \ll 1$ |
| 4: $\quad$ if $r \geq M$ then |
| 5: $\quad\quad r \leftarrow r - M$ |
| 6: $\quad$ end if |
| 7: end for |
| 8: return $r$ |

| Algorithm 4 Proposed method computing $r = 2^{2n} \mod M$ based on Montgomery multiplication |
|---|
| Require: odd $M, n = \lfloor \log_2 M \rfloor + 1, s \cdot 2^t = n$ |
| Ensure: $r = 2^{2n} \mod M, 0 \leq r < M$ |
| 1: $r \leftarrow 2^n$ |
| 2: while $s > 0$ do |
| 3: $\quad r \leftarrow r - M$ |
| 4: $\quad shift \leftarrow n - \lfloor \log_2 r \rfloor$ |
| 5: $\quad$ if $s \geq shift$ then |
| 6: $\quad\quad r \leftarrow r \ll shift$ |
| 7: $\quad\quad s \leftarrow s - shift$ |
| 8: $\quad$ else |
| 9: $\quad\quad r \leftarrow r \ll s$ |
| 10: $\quad\quad s \leftarrow 0$ |
| 11: $\quad$ end if |
| 12: end while |
| 13: if $r \geq M$ then |
| 14: $\quad r \leftarrow r - M$ |
| 15: end if |
| 16: for $i = 0$ to $t - 1$ step 1 do |
| 17: $\quad r \leftarrow MM(r, r)$ |
| 18: end for |
| 19: return $r$ |

| $n$ | # cycles for one MM | $s$ | $t$ | speed-up Alg. 4 vs. Alg. 3 |
|---|---|---|---|---|
| 128 | 30 | 8 | 4 | 3.4 |
| 256 | 84 | 8 | 5 | 4.2 |
| 512 | 288 | 16 | 5 | 4.8 |
| 1024 | 1080 | 32 | 5 | 5.1 |
| 2048 | 4200 | 64 | 5 | 5.2 |

LOW COST AND HIGH SPEED ARCHITECTURE OF MONTGOMERY MULTIPLIER

CROSS-REFERENCE TO RELATED APPLICATIONS

This application claims the benefit of U.S. Provisional Application No. 61/233,432, filed on Aug. 12, 2009.

This application is related to U.S. patent application Ser. No. 12/713,297, filed on Feb. 26, 2010. The disclosures of the above applications are incorporated herein by reference in their entirety.

FIELD

The present disclosure relates to cryptography systems and methods, and more particularly to Montgomery multiplier architectures in cryptographic systems and methods.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cryptographic systems for data communication and storage may use public key cryptography. In public key cryptography, data may be encrypted and decrypted with a pair of keys. For example, a public key and a private key may be used to encrypt and decrypt the data, respectively. It is extremely difficult to derive the private key from the public key. Cryptography systems that use public key cryptography include, for example, Rivest, Shamir, and Adleman (RSA) cryptography and elliptic curve cryptography (ECC) over prime fields.

In public key cryptography, plain text data is encrypted into cipher text using the public key at a first node. The cipher text is transmitted to a second node. At the second node, the cipher text is decrypted into the plain text data using the private key.

For example, to generate the public key (n, e) in RSA cryptography, two distinct prime numbers of similar bit length p and q are selected. A modulus n=pq is calculated and used for both the public and private keys. The integer e is selected based on $1 \leq e \leq \phi(pq)$, where e and $\phi(pq)$ share no divisors other than 1 (i.e. e and $\phi(pq)$ are co-prime), and $\phi$ corresponds to Euler's totient function. The private key (n, d) corresponds to de≡1 (mod $\phi(pq)$).

To encrypt a message M into cipher text at the first node, the message M is changed to an integer $0 \leq m \leq n$ using a padding scheme. The cipher text c is calculated according to $c = m^e$ mod n and transmitted to the second node. At the second node, m is recovered according to $m = C^d$ mod n, and M is recovered from m according to the padding scheme.

Accordingly, ECC and RSA cryptography each involve multiplication and division of large operands. For example, for $c = m^e$ mod n, m is multiplied by itself e times, and reduced modulo n after each multiplication. In arithmetic computation, Montgomery multiplication is typically used when the modulus is large (e.g. 128 to 1024 bits).

For example, Montgomery multiplication of two integers X and Y with a modulo M (e.g. MM(X, Y, M)) and n bits of precision results in a number Z according to Z=MM(X, Y, M)=$XY2^{-n}$ mod M, where M is an integer between $2^{n-1}$ and $2^n$ and n is an integer (e.g. typically $n = \lceil \log_2 M \rceil + 1$). In RSA cryptographic systems, M is the product of the prime numbers p and q as described above. In elliptic curve cryptographic systems over prime fields, M is a large prime number. Accordingly, M is an odd number.

Figure 1:
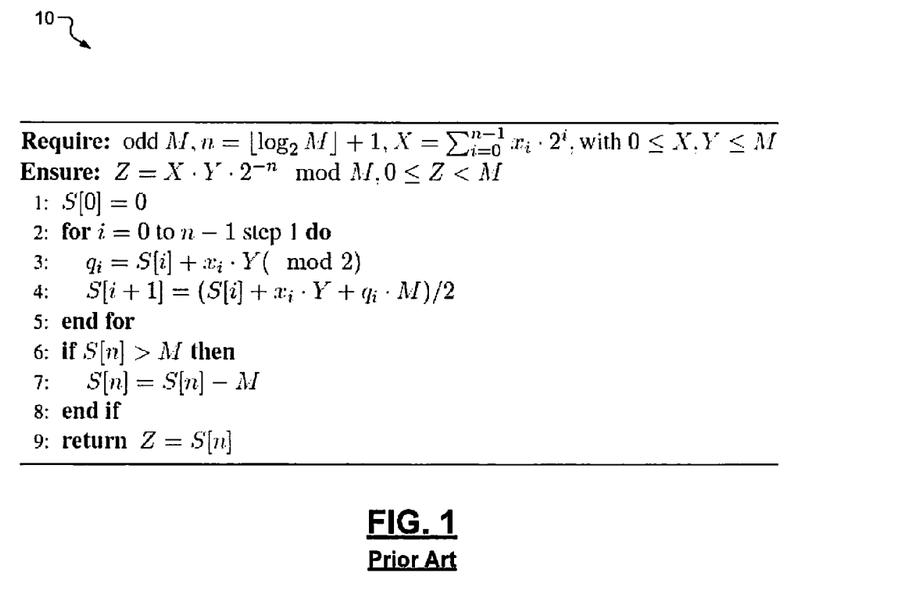
FIG. 1 is a Montgomery multiplication method according to the prior art.

Referring now to FIG. 1, Montgomery multiplication may be performed according to an example radix-2 Montgomery multiplication method 10. In the method 10, $S_i$ is a partial sum for loop i of n loops, and q (0 or 1) is selected such that S+XY+qM is divisible by 2. In each loop i, if $S[i+1]+x_i \cdot Y$ is odd, then M is added to the result. Further, a shift register storing X (as a plurality of words $x_i$) is shifted to the right by 1. Accordingly, the partial sum stored as S[n] after n loops is less than or equal to 2M.

The calculation in step 4 of the method 10 may be performed using a carry-save adder, which includes double registers to store partial sums and carries. Alternatively, large operands in step 4 may be split into smaller operands that can be processed using a pipelined systolic array. Adjacent processing elements (PE) interchange the least significant bit (LSB) of the partial sum or the carry in two processing cycles. Accordingly, the latency of one Montgomery multiplication is approximately 2n cycles, where n is the bit size of the operands. (See A. Tenca and C. K. Koc, "A scalable architecture for Montgomery multiplication," *CHES 99, Lecture Notes in Computer Sciences*, 1717, pp. 94-108, 1999; A. Tenca, G. Todorov, and C. K. Koc, "High-radix design of a scalable modular multiplier," *CHES 2001, Lecture Notes in Computer Sciences*, 2162, pp. 185-201, 2001; and A. Tenca and C. K. Koc, "A scalable architecture for modular multiplication based on Montgomery's algorithm," *IEEE Trans. Computers*, 52(9), pp. 1215-1221, 2003).

The architecture can be optimized via pre-computing the partial sum using two possibilities for the most significant bit (MSB) from the previous PE. Accordingly, the latency can be reduced to n cycles with a marginal increase in area. (See M. Huang, K. Gaj, S. Kwon, and T. El-Ghazawi, "An optimized hardware architecture for the Montgomery multiplication algorithm," *Proc. 11th International Workshop on Practice and Theory in Public Key Cryptography*, PKC 2008, Barcelona, Spain, pp. 214-228, March 2008). Regardless of which architecture is used, a large number of flip flops are required to perform the Montgomery multiplication. Consequently, Montgomery multiplier architecture requires a large chip area to accommodate the flip flops.

SUMMARY

A system to perform Montgomery multiplication includes a first multiplier array configured to multiply w bits of an operand X by W bits of an operand Y, where w and W are integers and w is less than W. A second multiplier array is configured to multiply w bits of an operand Q by W bits of a modulo M. An adder array is configured to add outputs of the first and second multiplier arrays to generate a sum. A partial sum array is configured to store a left portion of the sum. A memory is configured to store a right portion of the sum. Q computation logic includes a lookup table and a half-multiplier that compute W bits of the operand Q sequentially in $$2 \cdot \frac{W}{w}$$

cycles or $$\frac{W}{w}$$

cycles. The W bits of the operand Q are stored in the fourth buffer for use by subsequent W×W operations.

In other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 3 is a Montgomery multiplication method according to the present disclosure;

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
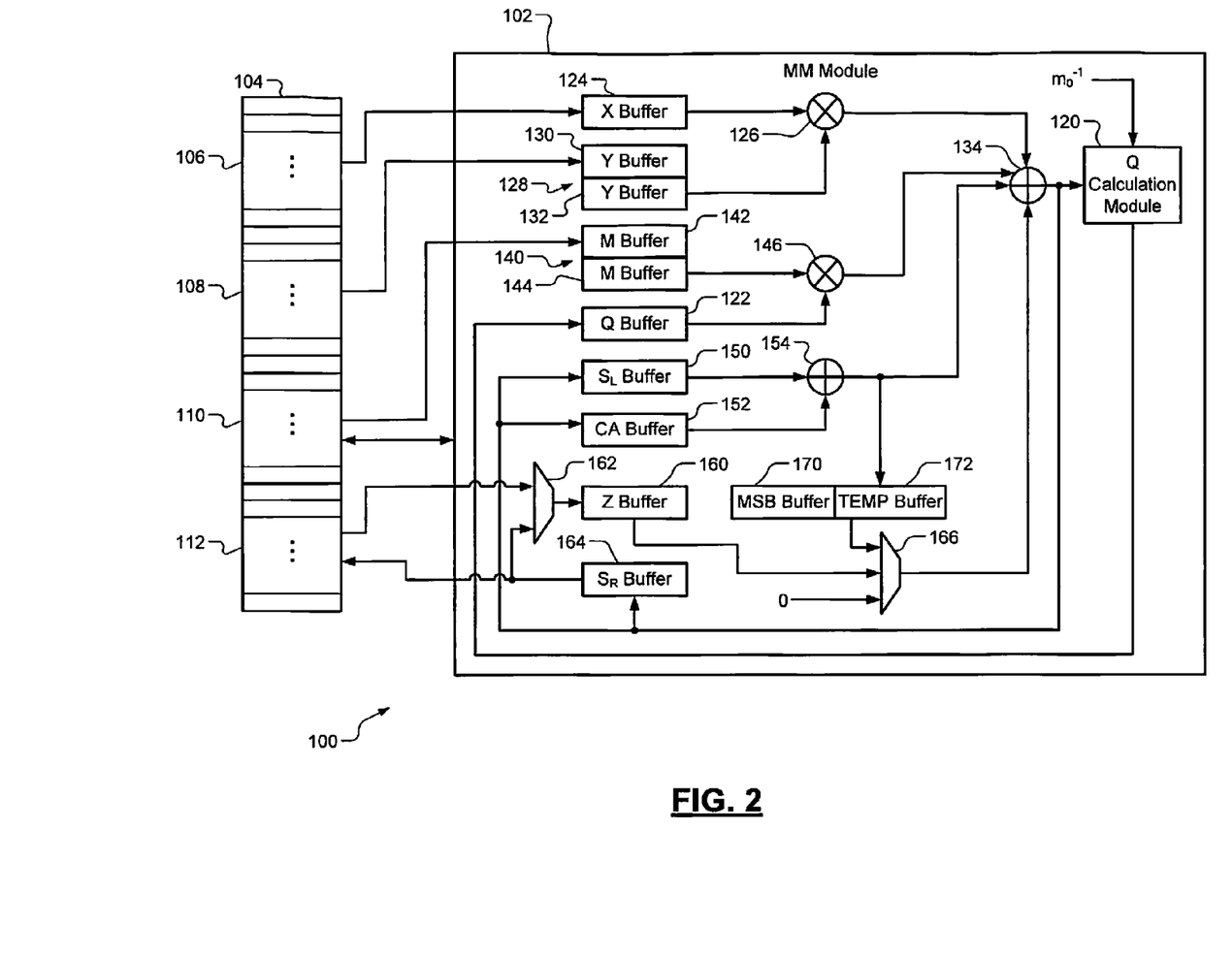
FIG. 2 illustrates a Montgomery multiplier system according to the present disclosure.

Referring now to FIG. 2, a Montgomery multiplier (MM) system 100 includes an MM module 102 (which includes MM core logic) and memory, such as random access memory (RAM) 104. Operands X and Y to be multiplied by the MM module 102 are stored in X and Y portions 106 and 108 of the RAM 104. For example, if the operands X and Y are each 512 bits long, the respective X and Y portions 106 and 108 of the RAM 104 may store the operands as 8 words of 64 bits each (i.e. f words of W bits). Each word of W bits may be further separated into 8 words of 8 bits each (i.e. e words of w bits). Similarly, a modulo operand M is stored in an M portion 110 of the RAM 104 as f words of W bits each, and the segment Z of the result is stored in a Z portion 112. The width of the RAM 104 is represented by w_RAM (i.e. the RAM 104 is w_RAM bits wide).

As such, the MM module 102 does not address the entire operands (e.g. X, Y, and M) during each cycle. Instead, the MM module 102 performs W×W multiplications sequentially (e.g. via a w×w multiplier array). In other words, the MM module 102 multiplies W bits of each of the operands X, Y, and M instead of addressing the entire operands. Consequently, fewer flip flops FF (FFs, e.g. D-FFs) are required, and less chip area is needed to accommodate the flip flops. A portion of the flip flops are replaced with RAM for storing portions of the operands that are not being multiplied in a particular cycle. In some implementations (e.g. when RAM bandwidth is limited), double buffers may be used to reduce data transfer overhead. For example, while the multiplication $X_i \times Y_j$ is performed, $Y_{i+1}$ and $M_{i+1}$ can be transferred to a D-FF buffer.

For example, when a word $X_i$ of size W is multiplied by a word $Y_j$ of size W, the lowest W bits of the product may be stored in RAM, and the highest W bits of the product may be stored in partial sum registers and carry registers within the MM module 102.

Because W is generally large, $Q_i$ of W bits (i.e. $Q_i$ satisfying $S_{i+1}=S_i+X_i \cdot Y+Q_i \cdot M=0 \bmod 2^w$) can not be obtained directly from a lookup table (LUT). Instead, $Q_i$ is computed sequentially (e.g. using Q calculation module 120 to compute w bits of Q sequentially) when performing the multiplication of $X_i$ by $Y_0$ and stored in Q buffer 122. Further, $Q_i$ may be retrieved from the Q buffer 122 when scanning subsequent words of the operands Y and M.

When using Montgomery multiplication for either RSA or ECC cryptography, operands are converted to and from a Montgomery domain. A parameter $r=2^{2n}$ mod M, where n is the size of the operand, is used to perform the conversion. Accordingly, the MM module 102 participates in computing r.

Referring again to FIG. 2, an X buffer 124 receives the operand X from the RAM 104 and provides the operand X to a first multiplier array 126. The X buffer 124 includes, for example, w_RAM bit or 2×w_RAM bit D-FFs (depending on the $Q_i$ computation scheme). A double Y buffer 128 includes a Y buffer 130 that receives the operand Y from the RAM 104 and a Y buffer 132 that receives the operand Y from the Y buffer 130 and provides the operand Y to the first multiplier array 126. The double Y buffer 128 includes 2×W bit D-FFs. A product of the first multiplier array 126 is provided to a first adder array 134.

A double M buffer 140 includes an M buffer 142 that receives the modulo M from the RAM 104 and an M buffer 144 that receives the modulo M from the M buffer 142 and provides the modulo M to a second multiplier array 146. The Q buffer 122 receives w bits of Q data that correspond to the operand Q from the Q calculation module 120 either each cycle or every other cycle and provides the w bits of Q data to the second multiplier array 146. For example, the Q buffer 122 receives the w bits of Q data when an initial portion of $M_0$ of the modulo M is provided to the second multiplier array 146. The Q buffer 122 retains the same W bits of Q data until calculations for $X_i \cdot Y_{f-1}$ and $Q \cdot M_{f-1}$ are complete. The Q buffer 122 includes W bit D-FFs. A product of the second multiplier array 146 is provided to the first adder array 134.

An $S_L$ buffer 150 includes W+1 bit D-FFs and a carry array (CA) buffer 152 includes ((3×W)/w)+1 bit D-FFs. The $S_L$ buffer 150 and the CA buffer 152 update the leftmost W+1 bits of the partial sum and provide data to a second adder array 154. An output of the second adder array 154 is provided to the first adder array 134.

A Z buffer 160 receives data corresponding to the partial sum from the RAM 104 via a multiplexer 162. The Z buffer 160 includes W bit D-FFs. If a size of the operand n is small, the Z buffer 160 may receive the data directly from an $S_R$ buffer 164. The Z buffer 160 provides the data to the first adder array 134 via a multiplexer 166. The $S_R$ buffer 164 includes w_RAM bit D-FFs to latch the rightmost bits of the partial sum received from the first adder array 134. The $S_R$ buffer 164 provides the rightmost bits of the partial sum to the RAM 104.

A most significant bit (MSB) buffer 170 and a temporary (TEMP) buffer 172 include W+1 bit D-FFs. The MSB buffer 170 and the TEMP buffer 172 latch a sum of $S_L$ and CA (received from the second adder array 154) after $Y_{f-1}$ and $M_{f-1}$ are processed. Accordingly, it is not necessary to store the sum of $S_L$ and CA in the RAM 104. Outputs of the MSB buffer 170 and the TEMP buffer 172 are provided to the first adder array 134 (via the multiplexer 166) when a next W bit word of the operand X, $Y_{f-1}$, and $M_{f-1}$ are processed. When performing $x_0 \cdot Y_{f-1}$, the multiplexer 166 provides data from the MSB buffer 170 and the TEMP buffer 172 to the first adder array 134. When performing $x_0 \cdot Y_j$, in $X_i \cdot Y_j$ ($i \neq 0$, $j \neq f-1$) the multiplexer 166 provides data from the Z buffer 160 to the first adder array 134. Otherwise, the multiplexer 166 provides 0 to the first adder array 134.

Referring now to FIG. 3, the MM module 102 performs Montgomery multiplication according to an example Montgomery multiplication method 200. In the method 200, the operand X is stored in RAM as f words of W bits (e.g. $X = X_0, X_1, \ldots, X_{f-1}$). Each $X_i$ may be stored as e words of w bits (e.g. $x_0, x_1, \ldots, x_{e-1}$). The operand Y is stored in RAM as f words of W bits (e.g. $Y = Y_0, Y_1, \ldots, Y_{f-1}$). Each $Y_j$ may be stored as e words of w bits (e.g. $y_0, y_1, \ldots, y_{e-1}$). The modulo M is stored in RAM as f words of W bits (e.g. $M = M_0, M_1, \ldots, M_{f-1}$). Each $M_j$ may be stored as e words of w bits (e.g. $m_0, m_1, \ldots, m_{e-1}$).

An intermediate result is represented by (msb, Z), where msb is the most significant bit and is stored in a one bit D-FF. A final product Z is stored in RAM as f words of W bits (e.g. $Z = Z_0, Z_1, \ldots, Z_{f-1}$). For $Z_{f-1}$, the msb and its leftmost w bits form $Z_{e-1}$, and the remaining W-w bits of $Z_{f-1}$ form $z_0, z_1, \ldots, z_{e-2}$. Each of the remaining $Z_j$ is stored as e words of W bits. $S_R$ corresponds to the rightmost W bits of the partial sum after e cycles. When the number of the bits of $S_R$ reaches the word size of the RAM, $S_R$ is shifted into the RAM. $S_R$ may be denoted as e words of w bits (e.g. $s_{R,0}, S_{R,1}, \ldots, S_{R,e-1}$).

The leftmost W+1 bits of the partial sum corresponds to the sum of $S_L$ and CA, where CA is the carry array $\Sigma_{i=0}^{e-1} ca_i \cdot 2^w$, and $ca_{e-1}$ has 4 bits and the remaining $c_{ai}$ each have 3 bits. $S_L$ may be stored as e words (e.g. $S_{L,0}, S_{L,1}, \ldots, S_{L,e-1}$), where $S_{L,e-1}$ has w+1 bits and the remaining $S_L$ words have w bits. $Q_i$ is selected to satisfy $S_{i+1} = S_i + X_i \cdot Y + Q_i \cdot M = 0$ mod $2^w$. The rightmost w bits of the product of two w bit numbers are shown as $(\bullet)_R$. Conversely, the leftmost w bits of the product of two w bit numbers are shown as $(\bullet)_L$.

The method 200 includes index loops i, j, g, and k. The loop of index i computes $S_{i+1} = S_i + X_i \cdot Y + Q \cdot M =$ mod M. The loop of index j separates Y and M into the W bit words that are scanned in each round (e.g. each iteration of the loop). The loop of index g performs W×W multiplications (e.g. $X_i \cdot Y_j$ and $Q_i \cdot M_j$) and accumulation. To perform W×W multiplications, each factor of W bits is separated into w bit words, which are scanned in each round.

The loop of index k performs w×W multiplications (e.g. $x_g \cdot Y_j$ and $q \cdot M_j$) and accumulation. $Y_j$ and $M_j$ are separated into w bit words, which may be multiplied by $x_g$ and q simultaneously. The products of these multiplications are accumulated and shifted to partial sum and carry registers in one cycle. Accordingly, the w×W multiplications performed within the loop of index k may be performed in parallel.

The method 200 calculates $Q_i$ while performing the $X_i \cdot Y_0$ calculation. If the rightmost w bits s of $S_i + X_i \cdot Y_0$ are known, then the rightmost w bits of $Q_i$ are calculated according to $q_0 = s \cdot (-m_0^{-1}) \mod 2^w$, where $m_0$ corresponds to the rightmost w bits of M. For $q_0$, the rightmost w bits of $S_i + X_i \cdot Y_0 + q_0 \cdot M_0$ are zeros. The second rightmost w bits of $S_i + X_i \cdot Y_0 + q \cdot M_0$ are calculated according to $s = (S_i + X_i \cdot Y_0 + q_0 \cdot M_0)/2^w \mod 2^w$. Then, $q_i = s \cdot (-m_0^{-1}) \mod 2^w$ such that $s + q_1 \cdot m_0 = 0 \mod 2^w$. When $q_g$ is determined, s may be updated according to $s = (s + q_g \cdot M_0)/2^w \mod 2^w$. Then, can be computed sequentially according to $q_{g+1} = s \cdot (-m_0^{-1}) \mod 2^w$. After e loops of index g, $Q_i$ may be determined and stored in shift registers. Accordingly, $Q_i$ may then be used to perform multiplications such as $Q_i \cdot M_j$, where $j \geq 1$.

In steps 51-53 of the method 200, the final reduction may be performed via a w_RAM (e.g. 32) bit subtractor and a one bit carry register. For example, intermediate results may be stored in the Y portion 108 of the RAM 104. If a carry from the reduction is one, the contents of the Y portion 108 are determined to be the final result. Otherwise, the contents of the Z portion 112 are determined to be the final result. If a particular application requires that the contents of the X portion 106, the Y portion 108, and the Z portion 112 be retained, the RAM 104 may be extended to store the intermediate results of steps 51-53.

In RSA and ECC cryptographic systems, M is always odd. Accordingly, $-m_0^{-1} \mod 2^w$ may be predetermined and stored. For example, $-m_0^{-1} \mod 2^w$ may be stored in $(w-1) \times 2^{w-1}$ read only memory (ROM).

Figure 4A:
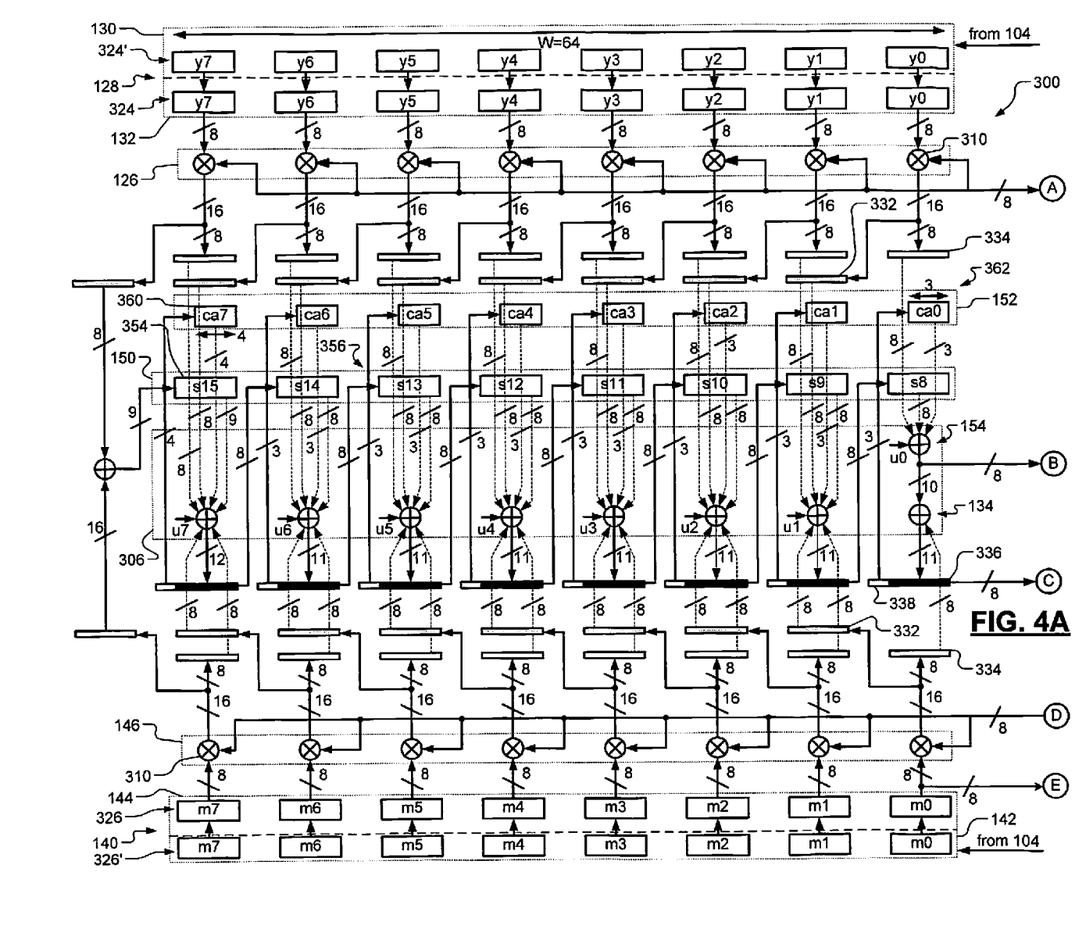
FIGS. 4A, 4B, and 4C are a functional block diagram of a Montgomery Multiplier according to the present disclosure.
Figure 4B:
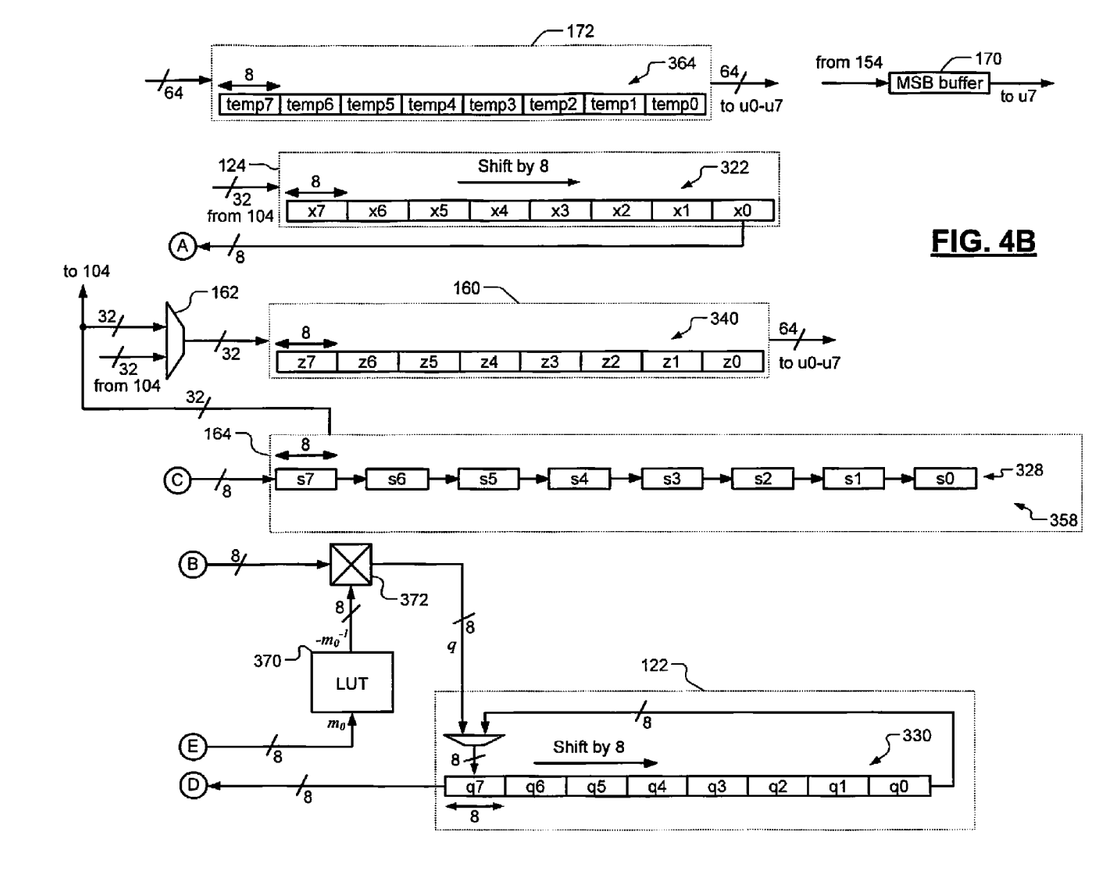
Figure 4C:
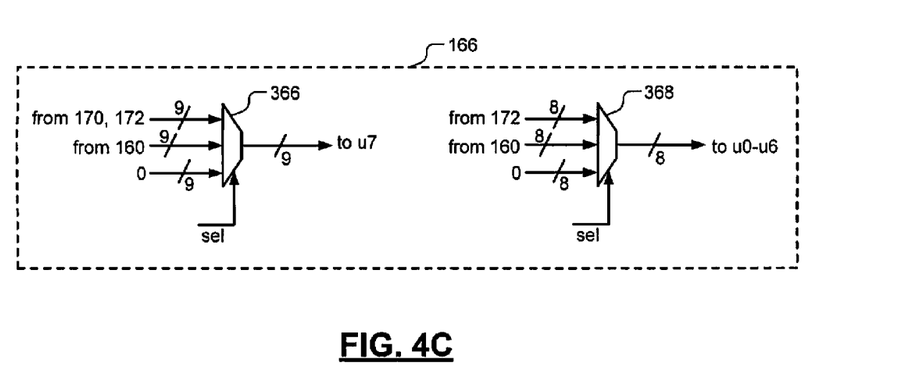

Referring now to FIGS. 4A, 4B, and 4C, a Montgomery Multiplier (MM) 300 according to the present disclosure includes the multiplier arrays 126 and 146 and an adder array 306 (which includes, for example, the adder arrays 134 and 154 as shown in FIG. 2). Each of the multiplier arrays 126 and 146 includes e (e.g. 8) w×w multipliers 310. For example, the multiplier array 126 communicates with X and Y buffers 124 and 128 and performs W×W multiplications of $X_i \cdot Y_j$. Conversely, the multiplier array 146 communicates with M and Q buffers 140 and 122 and performs W×W multiplications of $Q_i \cdot M_j$. The adder array 306 performs additions shown in steps 15, 17, 30, 32, and 37 of the method 200.

The RAM 104 as shown in FIG. 2 stores one or more of the operands (e.g. $X_i$, $Y_j$, and/or $M_j$) and results (e.g. sum $Z_i$). Portions of the operands being addressed in a particular cycle are transferred to corresponding ones of the X buffer 124, the Y buffer 128, the M buffer 140, and the Z buffer 160. For example, the portions of the operands being addressed are transferred from the RAM 104 to corresponding shift registers 322 in the X buffer 124 and shift registers 324 and 326 in the Y buffer 132 and the M buffer 144 (via shift registers 324' and 326' in the Y buffer 130 and the M buffer 142, respectively). Similarly, the $S_R$ buffer 164 and the Q buffer 122 may include shift registers 328 and 330, respectively.

Outputs of the multiplier array 126 include, for example, the leftmost w bits 332 of the product of a w×w multiplication and the rightmost w bits 334 of the product of a w×w multiplication. The adder array 306 receives outputs of the multiplier array 126, partial sums, carry bits, and intermediate results u0-u7. Outputs of the adder array 306 include, for example, the rightmost w bits 336 and the leftmost 3 bits 338 of the corresponding sum.

The MM 300 addresses $Y_j$ and $M_j$ in each cycle. For example, if a word size $w_{RAM}$ of the RAM is less than W, then $Y_j$ and $M_j$ are transferred from the RAM 104 and stored in the shift registers 324' and 326'. The RAM 104 stores $Z_j$ (of the final product Z). $Z_j$ is transferred from the RAM 104 in $$\frac{W}{w_{RAM}}$$

cycles. Accordingly, the MM 300 may accumulate $Z_j$ while multiplying $X_i \cdot Y_j$. Multiple buffering may be used to eliminate data transfer overhead between the RAM 104 and logic of the MM 300. When the MM 300 is performing operations on $Y_j$, $M_j$, and $Z_j$, $Y_{j+1}$, $M_{j+1}$, and $Z_{j+1}$ can be transferred to alternate shift registers. For example, the Y and M buffers 132 and 144 provide two words of $Y_j$ and $M_j$ for a current W×W multiplication, and the Y and M buffers 130 and 142 receive $Y_{j+1}$ and $M_{j+1}$ for a next W×W multiplication. The z buffer 160, which includes shift registers 340, receives $Z_j$. The z buffer 160 stores $Z_j$ for a current W×W multiplication, and subsequently stores $Z_{j+1}$ for a next W×W multiplication.

The values of W and w determine performance and cost of the MM 300. For example, greater values correspond to an increase in processing speed and chip area, and therefore an increase in cost. Further, the value of w may be selected such that latency of data transfer from the RAM 104 is less than latency of one W×W multiplication. If the RAM 104 includes single-port RAM (i.e., one w bit word addressable per cycle), each word of $X_i$, $Y_j$, $M_j$, or $Z_j$ is transferable in $$\frac{W}{w_{RAM}}$$

cycles, and a single W×W multiplication is completed in $$\frac{W}{w}$$

cycles. Accordingly, the value of w may be selected such that $$4 \cdot \frac{W}{w_{RAM}} \leq \frac{W}{w} \Rightarrow \leq \frac{w_{RAM}}{4}.$$

Conversely, if the RAM 104 includes dual-port RAM, w may be selected such that $$w \leq \frac{w_{RAM}}{2}.$$

Since only w bits of $X_i$ are used in each cycle, multiple buffering is not required for $X_i$. $Q_i$ may be calculated during multiplication of $X_i \cdot Y_0$ and stored in the shift registers 330.

The buffers of the MM 300 include arrays of D-FFs to store results of multiplications. For example, the MM 300 includes the $S_L$ buffer 150, the $S_R$ buffer 164 (both the $S_L$ buffer 150 and the $S_R$ buffer 164 form a partial sum array), and the CA buffer 152 (i.e., a carry array). The $S_L$ buffer 150 includes e segments (e.g., 8). A leftmost segment 354 is instantiated as w+1 bit D-FFs to store $(q \cdot m_{e-1})_L + (x_g \cdot y_{e-1})_L$. The remaining e-1 (e.g., 7) segments 356 are instantiated as w bit D-FFs. The $S_R$ buffer 164 includes e segments. Although the rightmost e (e.g., 8) segments 358 of w bits are shown, the segments 358 may not be instantiated as D-FFs and are instead stored in the RAM 104. For example, a number of segments $n_{s1}$ storing $S_R$ instantiated as D-FFs is based on $w_{RAM}$. In other words, $n_{s1}$ may be the smallest number satisfying $n_{s1} \cdot w \geq w_{RAM}$ because the data may be stored in the RAM 104 when the data amounts to, for example, one word of RAM. However, when i=0 and j=0, $S_R$ will be all zeros and therefore is not written to the RAM 104. The CA buffer 152 includes e segments. A leftmost segment 360 is instantiated as 4-bit D-FFs to store $ca_{e-1}$. The remaining e-1 segments 362 are instantiated as 3-bit D-FFs. For example, as shown in steps 30 and 34 of the method 200, when k=e-1 and g=0: $sum_{e-1} = s_{L,e-1} + ca_{e-1} + (x_0 \cdot y_{e-1})_R + (x_0 \cdot y_{e-2})_L + z_{e-1} + (q \cdot m_{e-1})_R + (q \cdot m_{e-2})_L$ Each of $S_{L,e-1}$ and $z_{e-1}$ has w+1 bits and each of $(x_0 \cdot Y_{e-1})_R$, $(x_0 \cdot y_{e-2})_L$, $(q \cdot m_{e-1})_R$ and $(q \cdot m_{e-2})_L$ has w bits. The rightmost w bits of $sum_{e-1}$ will be stored in D-FFs for and the leftmost 3 bits of $sum_{e-1}$ will be stored in D-FFs for a following cycle. Accordingly, $ca_{e-1}$ has at least 3 bits and $sum_{e-1}$ has at least w+3 bits. To maintain $sum_{e-1}$ as w+3 bits, $ca_{e-1}$ should have 4 bits. Each remaining $ca_k$ may include 3 bits.

A sum of the values stored in the $S_L$ and CA buffers 150 and 152 (i.e., $S_L = (S_{L,e-1}, s_{L,e-2}, \ldots, S_{L,2}, S_{L,1}, s_{L,0})$) and $CA = (ca_{e-1}, ca_{e-2}, \ldots, ca_1, ca_0)$) corresponds to the leftmost W+1 bits for $Z_j + X_i \cdot Y_j + Q_i \cdot M_j + S_L + CA$. The leftmost bits of $Z_j + X_i \cdot Y_j + Q_i \cdot M_j + S_L + CA$ are accumulated for a following operation $Z_{j+1} + X_i \cdot Y_{j+1} + Q_i \cdot M_{j+1} S_L + CA$. The rightmost bits of $Z_j + X_i \cdot Y_j + Q_i \cdot M_j + S_L + CA$ are transferred to the RAM 104 (except when j=0).

The MSB and TEMP buffers 170 and 172 are used to eliminate the latency of transferring the sum of $S_L$ and CA (when j=f-1) to the RAM 104, and the latency of transferring $Z_{f-1}$ from the RAM 104 to the Z buffer 160. When $S_L$+CA is performed for j=f-1, the sum is stored in the MSB and TEMP buffers 170 and 172. For example, the rightmost 64 bits of the sum of the $S_L$ and CA buffers 150 and 152 are stored in shift registers 364 of the TEMP buffer 172. The last carry of the sum of the $S_L$ and CA buffers 150 and 152 is stored in the MSB buffer 170. For j=f-1, the sum of $S_L$ and CA is performed sequentially (e.g. because W is large and the operation can not be completed in one cycle) to obtain (msb, $Z_{e-1}$).

However, if timing closure can be satisfied, the sum of $S_L$ and CA can be performed in one cycle and stored in parallel-in-parallel-out buffers (e.g. the MSB buffer 170 and the TEMP buffer 172). In other words, in this case the TEMP buffer 172 may be implemented without shift registers because the sum can be completed in one cycle. The next time $Z_{f-1}$ is loaded, the value can be input directly to the adder array 306 from the MSB and TEMP buffers 170 and 172.

Referring now to FIG. 4C, values of u0 through u7 are provided to the adder array 306 via multiplexers 366 and 368 (represented by the multiplexer 166 in FIG. 2). The multiplexers 366 and 368 are responsive to, for example, 2-bit selector signals sel. The multiplexer 366 outputs u7. For example, when performing $x_0 \cdot Y_{f-1}$, the multiplexer 366 outputs the contents of the MSB buffer 170 and the contents of temp7 of the TEMP buffer 172. When performing $x_0 \cdot Y_j$ in $X_i \cdot Y_j (i \neq 0, j \neq f-1)$, the multiplexer 366 outputs the contents of z7 of the Z buffer 160 and a 0 bit. Otherwise, the multiplexer 366 outputs all zero bits.

The multiplexer 368 outputs u0-u6. For example, when performing $x_0 \cdot Y_{f-1}$ the multiplexer 368 outputs the contents of temp0 through temp6 of the TEMP buffer 172. When performing $x_0 \cdot Y_j$ in $X_i \cdot Y_j$ (i≠0, j≠f−1), the multiplexer 368 outputs the contents of z0 through z6 of the Z buffer 160. Otherwise, the multiplexer 366 outputs all zero bits.

The MM 300 calculates $Q_i$ of W bits while performing the multiplication $X_i \cdot Y_0$. The MM 300 obtains w bits of $Q_i$ every two cycles: one cycle to update s according to $s=(s+q_g \cdot M_0)/2^w = 2^w$, and one cycle to determine q of w bits according to $q_{g+1}=s \cdot (-m_0^{-1}) \bmod 2^w$. For example, the MM 300 includes a lookup table (LUT) 370 and a w×w half multiplier 372. The half multiplier 372 calculates $a \cdot b \bmod 2^w$. The LUT 370 stores $-m_0^{-1}$. The LUT 370 may be instantiated in, for example, read only memory.

Figure 5:
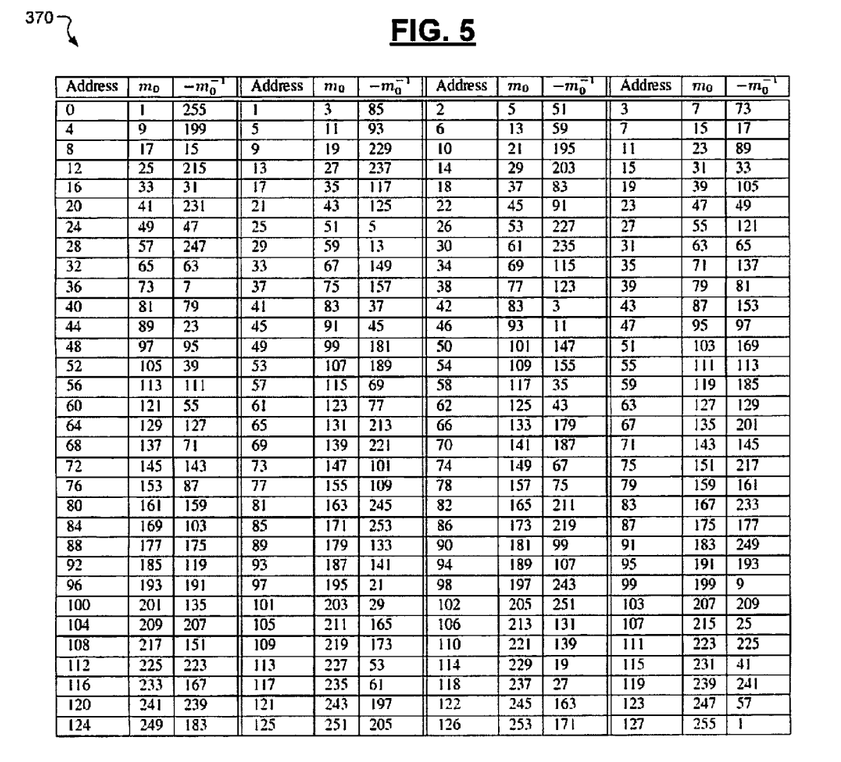
FIG. 5 is a lookup table for calculating $-m_0^{-1}$ according to the present disclosure.

Referring now to FIG. 5, the LUT 370 stores values of $-m_0^{-1}$ corresponding to input values of $m_0$ in address locations 0-127, where w=8. For example, to calculate q of w bits corresponding to Qi, $-m_0^{-1} \bmod 2^w$ (where $m_0$ is the rightmost w bit word of the modulo M) must first be determined. When w is small (e.g. 8), $-m_0^{-1}$ may be stored in a LUT of size (w−1)×$2^{w−1}$ (where M and $-m^{-1} \bmod 2^w$ are odd). However, for higher speed operations, the multiplier size w may be larger. For example, if the multiplier is 2w, the size of a LUT will increase by a factor of $2^{w+1}$.

Because M does not change frequently when performing high-level operations in RSA and ECC cryptography systems, $-m_0^{-1}$ can be pre-calculated and stored in a 2w bit buffer. For a fixed modulo M, the pre-calculation of $-m_0^{-1}$ may be performed only once prior to Montgomery multiplication. When $m_0=m_{0L} \cdot 2^w + m_{0R}$ (where $0 \leq m_{0L}, m_{0R} \leq 2^w-1$), $-m_0^{-1} \bmod 2^{2w} = m_L \cdot 2^w + M_R$ (where $0 \leq m_L, m_R \leq 2^w-1$) is calculated to satisfy $m_0 \cdot (-m_0^{-1}) = -1 \bmod 2^{2w}$. As such, can be determined according to $m_R = -m_{0R}^{-1} \bmod 2^w$.

Figure 6A:
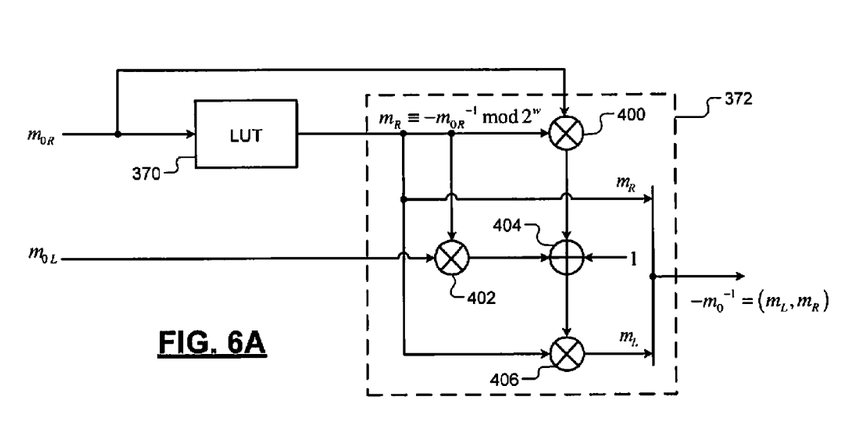
FIG. 6A illustrates the lookup table and a half-multiplier according to the present disclosure.

Referring now to FIGS. 5 and 6, the LUT 370 stores $m_R$, where the leftmost w−1 bits of $m_{0R}$ are the read address of the LUT 370, and the leftmost w−1 bits of $m_R$ are the output of the LUT 370. The relationship $(m_{0L} \cdot 2^w + m_{0R}) \cdot (m_L \cdot 2^w + m_R) + 1 = 0 \bmod 2^{2w}$ can be reduced to determine $m_L$ according to:

$$(m_{0L} \cdot m_R + m_{0R} \cdot m_L) \cdot 2^w + m_{0R} \cdot m_R + 1 = 0 \bmod 2^{2w}$$

$$(m_{0L} \cdot m_R + m_{0R} \cdot m_L) + (m_{0R} \cdot m_R)_L + 1 = 0 \bmod 2^w$$

$$m_L = m_R \cdot (1 + (m_{0L} \cdot m_R)_R + (m_{0R} \cdot m_R)_L) \bmod 2^w,$$

where $(\bullet)_L$ indicates the leftmost w bits of the product and $(\bullet)_R$ indicates the rightmost w bits of the product.

As shown in FIG. 6A, the LUT 370 receives the leftmost w−1 bits of $M_{0R}$ and outputs $m_R$ (where $m_R = -m_{0R}^{-1} \bmod 2^w$). The half multiplier 372 calculates $m_L = m_R \cdot (1+(m_{0L} \cdot m_R)_R + (m_{0R} \cdot m_R)_L) \bmod 2^w$. For example, a multiplier 400 multiplies the w bits of $m_{0R}$ by $m_R$. A multiplier 402 multiplies the w bits of $m_{0L}$ by $m_R$. An adder 404 outputs a sum of the leftmost w bits of the product of the multiplier 400, the rightmost w bits of the product of the multiplier 402, and 1. A multiplier 406 multiplies the sum output by the adder 404 by $m_R$ and outputs $m_L$. An output of the half multiplier 372 combines $m_R$ and $m_L$ to form $-m_0^{-1} = (m_L, m_R)$ of 2w bits. When the bit width of m0 is large (e.g. 16), the circuitry shown in FIG. 6A is used to calculate $-m_0^{-1}$. Conversely, when the bit width of m0 is small (e.g. 8), the circuitry shown in FIG. 6A is not necessary and the LUT 370 may be sufficient for determining $-m_0^{-1}$.

Figure 6B:
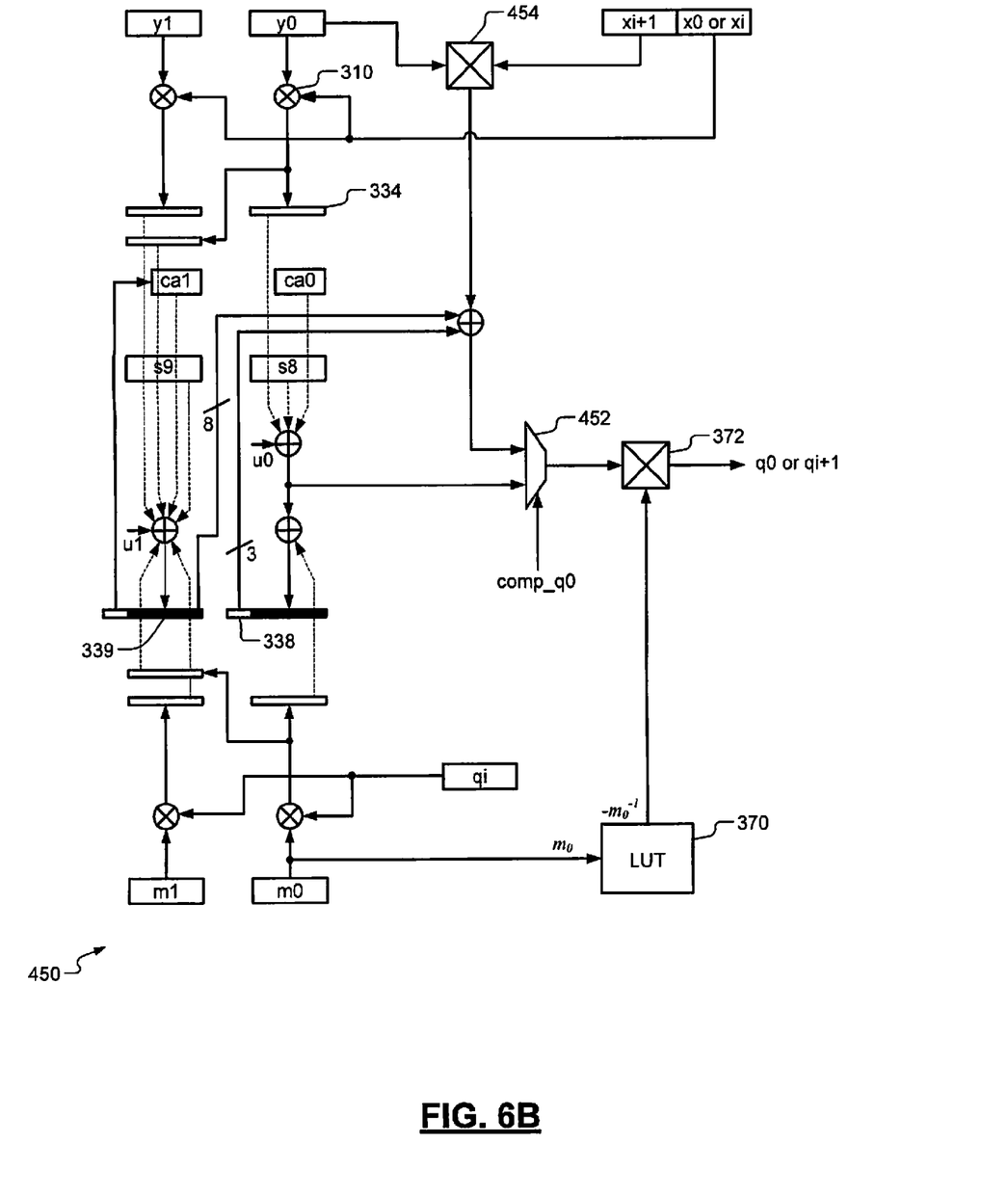
FIG. 6B illustrates modified architecture for calculating Q according to the present disclosure.

Referring now to FIG. 6B, a modified architecture 450 for calculating q in one cycle is shown. Before calculating $X_i \times Y_0$, a cycle is used to obtain $q_0$. Accordingly, the rightmost bits 334 of the result from $x_0 \times y_0$ are added to $u_0$ (the $S_L$ and CA buffers are zero during the first multiplication of $X_i \times Y_0$, and the multiplexer 166 selects zero if i is zero) and provided to the half multiplier 372. A comp_q0 signal, which indicates that q0 calculation, is generated as a select signal for the multiplexer 452.

In the subsequent $x_i \times Y_0$ calculations, $x_{i+1}$ and $y_0$ are provided to half multiplier 454. The output of the half multiplier 454 is added to the carry 338 and partial sum 339 (which will be latched into the rightmost 3 bits of the CA buffer 152 and the rightmost w-bits of the $S_L$ buffer 150) and provided to the half multiplier 372. The output of the half multiplier 372 is $q_{i+1}$. The comp_q0 signal is transitioned off to select the desired path at the multiplexer 452.

Figure 7:
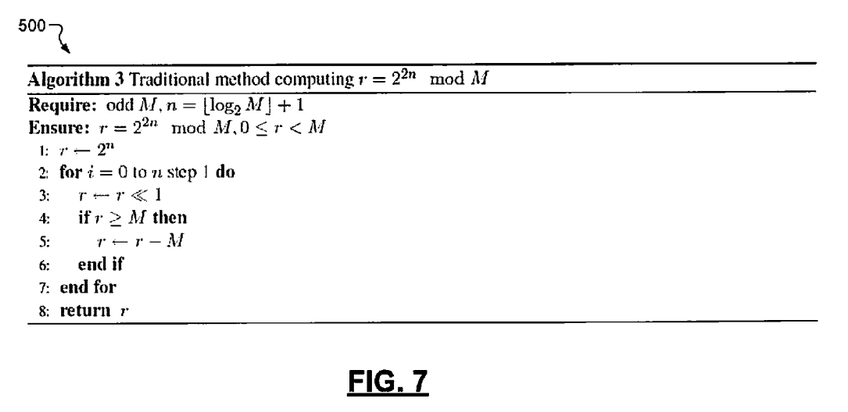
FIG. 7 is the method for calculating a parameter $r=2^{2n}$ mod M according to the prior art.

Referring now to FIG. 7, when using Montgomery multiplication for either RSA or ECC cryptography, operands are converted to and from a Montgomery domain. A parameter $r=2^{2n} \bmod M$, where n is the size of the operand, is used to perform the conversion. Conventionally, r may be determined according to the method 500.

Figure 8:
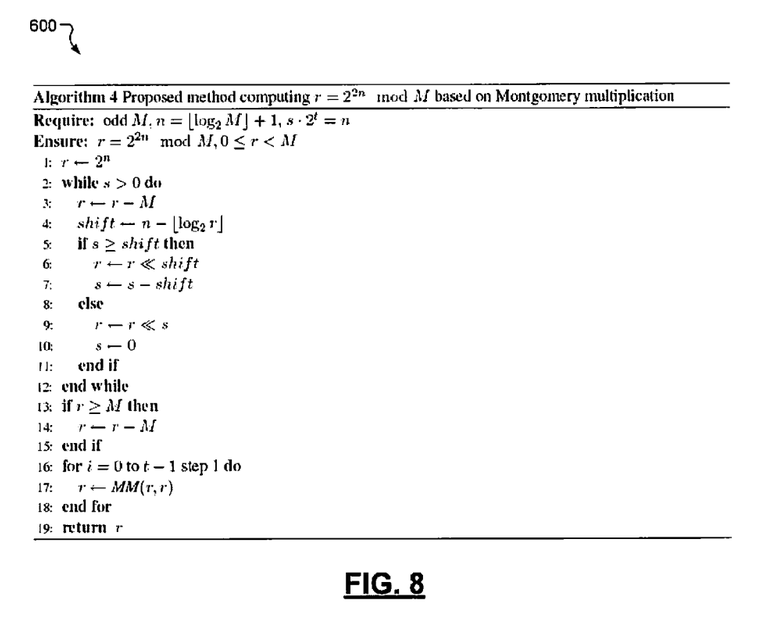
FIG. 8 is the method for calculating a parameter $r=2^{2n}$ mod M according to the present disclosure.

Referring now to FIG. 8, the MM 300 of the present disclosure calculates r according to the method 600, which calculates r by performing Montgomery multiplication recursively. As shown in the method 500, the operands are multiplied by $r=2^{2n} \bmod M$. In steps 1-15, the method 600 determines $r \leftarrow 2^{n+s} \bmod M$ via an improved reduction (maximum number of iterations is less than or equal to s). In steps 16-18, the method 600 determines $r \leftarrow MM(r, r)$ using Montgomery multiplication, where MM indicates the Montgomery multiplication. After t iterations of $r \leftarrow MM(r, r)$, $r \leftarrow 2^{n+2t \cdot s}$ is obtained.

A value of s is selected based on a speed ratio between the MM 300 and a word subtractor associated with the reduction in steps 1-7 of the method 600. For example, if $T_{MM}$ is the latency in cycles for one Montgomery multiplication, then $$T_{MM} \leq \frac{n}{w_{RAM}} \cdot s.$$

An integer t is selected based on $t=\log_2 n/s$. Because $t=\log_2 n/s$ is an integer, s may be selected as the smallest number satisfying $$T_{MM} \leq \frac{n}{w_{RAM}} \cdot s$$

and $$\frac{n}{s}$$

is a power of 2. $T_{MM}$ is determined based on the values of W and w according to $$T_{MM} = 3 \cdot \frac{W}{w_{RAM}} + \frac{n}{W} \cdot \left(\frac{n}{W} + 1\right) + \frac{n}{w_{RAM}}.$$

For a first W×W multiplication performed by the method 600, transferring three W bit words of $X_0$, $Y_0$, and $M_0$ takes $$3 \cdot \frac{W}{w_{RAM}} \text{ cycles.}$$

A W×n multiplication of $X_i \cdot Y$ takes $$\frac{n}{w}+1$$

cycles. Accordingly, a total number of W×n multiplications to be performed is $$\frac{n}{W}.$$

Figure 9:
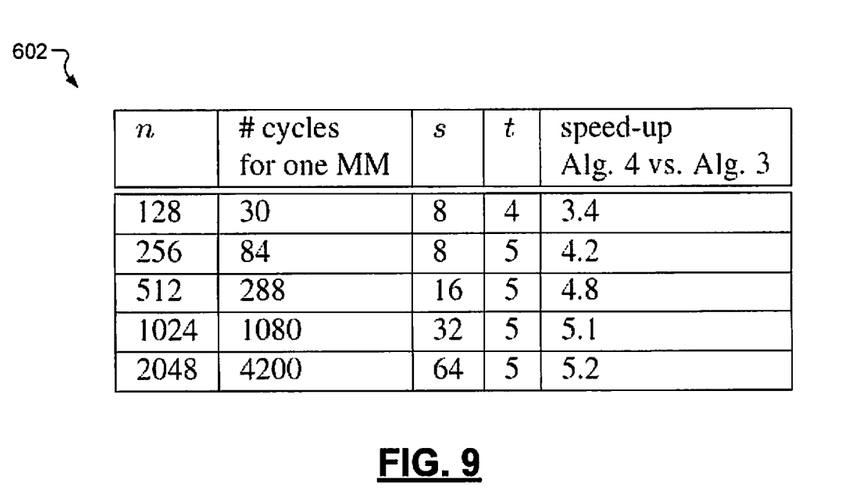
FIG. 9 is a table illustrating a speed increase for calculating the parameter r according to the present disclosure.

Referring now to FIG. 9, table 602 illustrates the speed increase for calculating r using the method 600 with respect to the method 500 where W=128, w=8, and $w_{RAM}$=32. For example, for n=128, 256, 512, 1024, 1024, and 2048, the method 600 calculates r 3.4, 4.2, 4.8, 5.1, and 5.2 times faster, respectively, than the method 500. The method 600 can be stored in, for example, ROM.

As described, the Montgomery multiplier of the present disclosure can perform Montgomery multiplications with operand sizes ranging from 2 to n by specifying how many W-bit words the operands include. A size of the operands (i.e. how many W-bit words) may be adjusted dynamically. For example, when the operand size is 128 bits, W=64, and n=1024, it is not necessary to add 896 zeroes to the 128 bit operand to form a 1024 bit operand. Instead, a size mode may be selected according to the size of the operand. For example, a size mode register may be programmed with a 2 to indicate 2 64 bit words. In this manner, the Montgomery multiplier can be shared between ECC cryptography systems (having bit boundaries of 128, 192, 224, 256, 384, 512, etc. bits) and RSA cryptography systems (having bit boundaries of 512, 1024, 2048, etc. bits).

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system to perform Montgomery multiplication, the system comprising:
a first multiplier array configured to multiply w bits of an operand X by W bits of an operand Y, where w and W are integers and w is less than W;
a second multiplier array configured to multiply w bits of an operand Q by W bits of a modulo M;
an adder array configured to add (i) outputs of the first multiplier array and (ii) outputs of the second multiplier array to generate a sum;
a partial sum array configured to store a left portion of the sum; and
a memory configured to store a right portion of the sum.

2. The system of claim 1, further comprising:
a first buffer configured to store the operand X as f words of W bits, where f is an integer;
a second buffer configured to store the operand Y as f words of W bits;
a third buffer configured to store the modulo M as f words of W bits; and
a fourth buffer configured to store the operand Q as f words of W bits.

3. The system of claim 2, wherein:
the first multiplier array sequentially receives the f words of W bits of the operand X as e words of w bits, where e is an integer; and
the second multiplier array sequentially receives the f words of W bits of the operand Q as e words of w bits.

4. The system of claim 3, wherein the first multiplier array multiplies one of the e words of the operand X by each of e words of w bits of the operand Y, and the second multiplier array multiplies one of the e words of the operand Q by each of e words of w bits of the modulo M.

5. The system of claim 3, wherein the first buffer includes a plurality of shift registers to sequentially provide the e words to the first multiplier array.

6. The system of claim 3, wherein the fourth buffer includes a plurality of shift registers to sequentially provide the e words to the second multiplier array.

7. The system of claim 3, wherein the second buffer simultaneously provides W bits of the operand Y to the first multiplier array.

8. The system of claim 3, further comprising Q computation logic, the Q computation logic comprising:
a lookup table; and
a half-multiplier, wherein the lookup table and the half-multiplier compute W bits of the operand Q sequentially in one of $$2 \cdot \frac{W}{w}$$

cycles or $$\frac{W}{w}$$

cycles, and wherein the W bits of the operand Q are stored in the fourth buffer for use by subsequent W×W operations of the system.

9. The system of claim 3, wherein the third buffer simultaneously provides W bits of the modulo M to the second multiplier array.

10. The system of claim 1, further comprising a lookup table (LUT) to receive a rightmost w bit word $m_0$ of the modulo M and outputs $-m_0^{-1}$.

11. The system of claim 10, further comprising a half multiplier that receives $-m_0^{-1}$.

12. The system of claim 1, wherein the operand X and the partial sum are stored in the memory.

13. The system of claim 1, wherein the operand Y and the modulo M are stored in the memory.

14. The system of claim 13, wherein the memory includes a first buffer configured to store W bits of the operand Y and W bits of the modulo M, and a second buffer configured to store next W bits of the operand Y and next W bits of the modulo M.

15. The system of claim 1, wherein the memory includes random access memory (RAM).

16. The system of claim 1, wherein the system is configured to operate based on a size mode, wherein the size mode is adjustable based on a size of at least one of the operand X and the operand Y.

17. The system of claim 1, wherein:

the operand X and the operand Y are converted to and from a Montgomery domain using a parameter $r=2^{2n}$ mod M, where n is an operand size;

before performing Montgomery multiplication on the operand X and the operand Y, the system calculates the parameter r i) by performing improved reduction and ii) using Montgomery multiplication recursively; and the system calculates the parameter r based on a value s, where s is selected to satisfy $$T_{MM} \leq \frac{n}{w_{RAM}} \cdot s,$$

TMM is a latency for one Montgomery multiplication, and wRAM a word size of the memory.

18. A method for performing Montgomery multiplication, the method comprising:

multiplying w bits of an operand X by W bits of an operand Y using a first multiplier array circuit, where w and W are integers and w is less than W;

multiplying w bits of an operand Q by W bits of a modulo M using a second multiplier array circuit;

adding (i) outputs of the first multiplier array circuit and (ii) outputs of the second multiplier array circuit to generate a sum;

storing a left portion of the sum in a partial sum array circuit; and storing a right portion of the sum in a memory.

19. The method of claim 18, further comprising:

storing the operand X as f words of W bits, where f is an integer;

storing the operand Y as f words of W bits;

storing the modulo M as f words of W bits; and storing the operand Q as f words of W bits.

20. The method of claim 19, wherein:

the first multiplier array circuit sequentially receives the f words of W bits of the operand X as e words of w bits, where e is an integer; and the second multiplier array circuit sequentially receives the f words of W bits of the operand Q as e words of w bits.

21. The method of claim 20, wherein the first multiplier array circuit multiplies one of the e words of the operand X by each of e words of w bits of the operand Y, and the second multiplier array circuit multiplies one of the e words of the operand Q by each of e words of w bits of the modulo M.

22. The method of claim 18, wherein the memory includes random access memory (RAM).

* * * * *